United States Patent [19]

Ward et al.

[11] Patent Number: 4,821,176
[45] Date of Patent: Apr. 11, 1989

[54] DATA PROCESSING ARRANGEMENT USING AN INTERCONNECTING NETWORK ON A SINGLE SEMICONDUCTOR CHIP

[75] Inventors: Christopher R. Ward; Stephen C. Hazon; David L. Swift, all of Bishops Stortford, United Kingdom

[73] Assignee: STC PLC, London, England

[21] Appl. No.: 941,788

[22] Filed: Dec. 15, 1986

[30] Foreign Application Priority Data

Mar. 18, 1986 [GB] United Kingdom ............... 8606587

[51] Int. Cl.[4] .......................................... G06F 13/00
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 4,348,720 | 9/1982 | Blahut et al. | 364/200 |
| 4,348,743 | 9/1982 | Dozier | 364/900 |
| 4,349,870 | 9/1982 | Shaw et al. | 364/200 |
| 4,422,143 | 12/1983 | Guttag | 364/200 |
| 4,438,492 | 3/1984 | Harmon, Jr. et al. | 364/200 |
| 4,460,972 | 7/1984 | Homan et al. | 364/900 |
| 4,528,625 | 7/1985 | McDonough et al. | 364/200 |

*Primary Examiner*—Thomas M. Heckler
*Assistant Examiner*—Michael A. Jaffe
*Attorney, Agent, or Firm*—Lee & Smith

[57] ABSTRACT

A data processing arrangement intended for use, inter alia, in a multi-processing system for use in association with a systolic array is implemented on a single semiconductor chip. The arrangement includes processing means (AU, MU) and storage means (ACC), interconnectable via an electronic equivalent (MM) of a crossbar switch.

16 Claims, 8 Drawing Sheets

DATA PROCESSING ARRANGEMENT USING AN INTERCONNECTING NETWORK ON A SINGLE SEMICONDUCTOR CHIP

TECHNICAL FIELD

The present invention relates to data processing arrangements, especially for use where high throughput and wide dynamic range are needed. Such arrangements have numerous applications, including military signal processing systems.

BACKGROUND OF THE INVENTION

In such systems, simple and rapid interconnection of the various units of the data processing arrangements is required. One example of an interconnection arrangement which is of interest in respect of the arrangement to be described herein is described in British Patent Specification No. 904607 (H. J. Dreyer et al 1-1-1). The main claim of that specification reads as follows:

"An electronic data-processing system, comprising a plurality of data processing units, immediate-access storage formed by a plurality of partial storage devices, a central control unit for controlling the performance by said data processing units of data processing operations in accordance with a programme of instructions, and an electronic co-ordinate switching network via which said data processing units and said partial storage devices can be interconnected, the arrangement being such that any one of said processing units can be connected to any one of said partial storage devices and that several simultaneous connections each of which involves a data processing unit and a partial storage device can be in existence at any one time."

Also of interest is "Rapid Bus Multiprocessor System" by M. P. Zoccoli and A. C. Sanderson, at pp 189–200 of "Computer Design", Nov. 1981. This, see its FIG. 1(b), includes a description of a system which is somewhat similar to that of the above-quoted Patent Specification.

SUMMARY OF THE INVENTION

An object of the present invention is to provide a data processing arrangement which embodies the principles of the above-mentioned Patent Specification but which extends the usefulness of such an arrangement.

According to the invention, there is provided a data processing arrangement implemented in semiconductor chip form, which includes input and output units, memory units, one or more processing units, and an interconnecting network which interconnects inputs and outputs of said units, wherein the interconnecting network is a co-ordinate array of semiconductor gates having data paths in first and second co-ordinates, wherein the inputs to and outputs from the units interconnected by said network are connected to respective ones of the co-ordinate data paths, wherein the data paths are multi-conductor data paths, wherein the establishment of connections between respective ones of the units on the chip is effected under the control of control means also implemented on the chip, and wherein some control functions exercised by said at least one of the control units occur under the influence of program data extracted from a said memory unit on the chip.

Note that in the arrangement to be described herein arithmetic units can include the normal arithmetic and logic units, and multliplier units, the latter being provided as separate units, since multiplication is a relatively long-time function.

BRIEF DESCRIPTION OF THE DRAWINGS

An embodiment of the invention will now be described with reference to the accompanying drawings, in which.

THE PROCESSING CHIP

Figure 1:
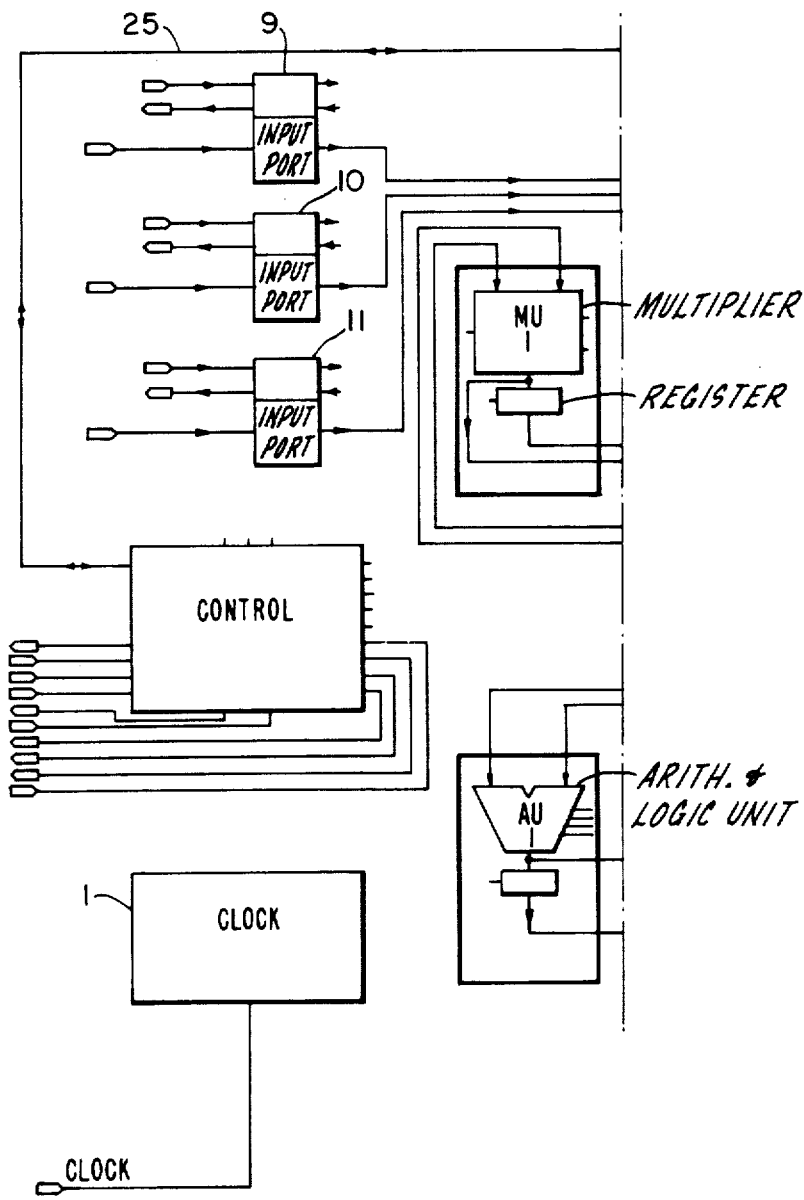
FIGS. 1 and 2, of which FIG. 2 should be placed to the right of FIG. 1, shows the system architecture of a data processing arrangement embodying the invention.
Figure 2:
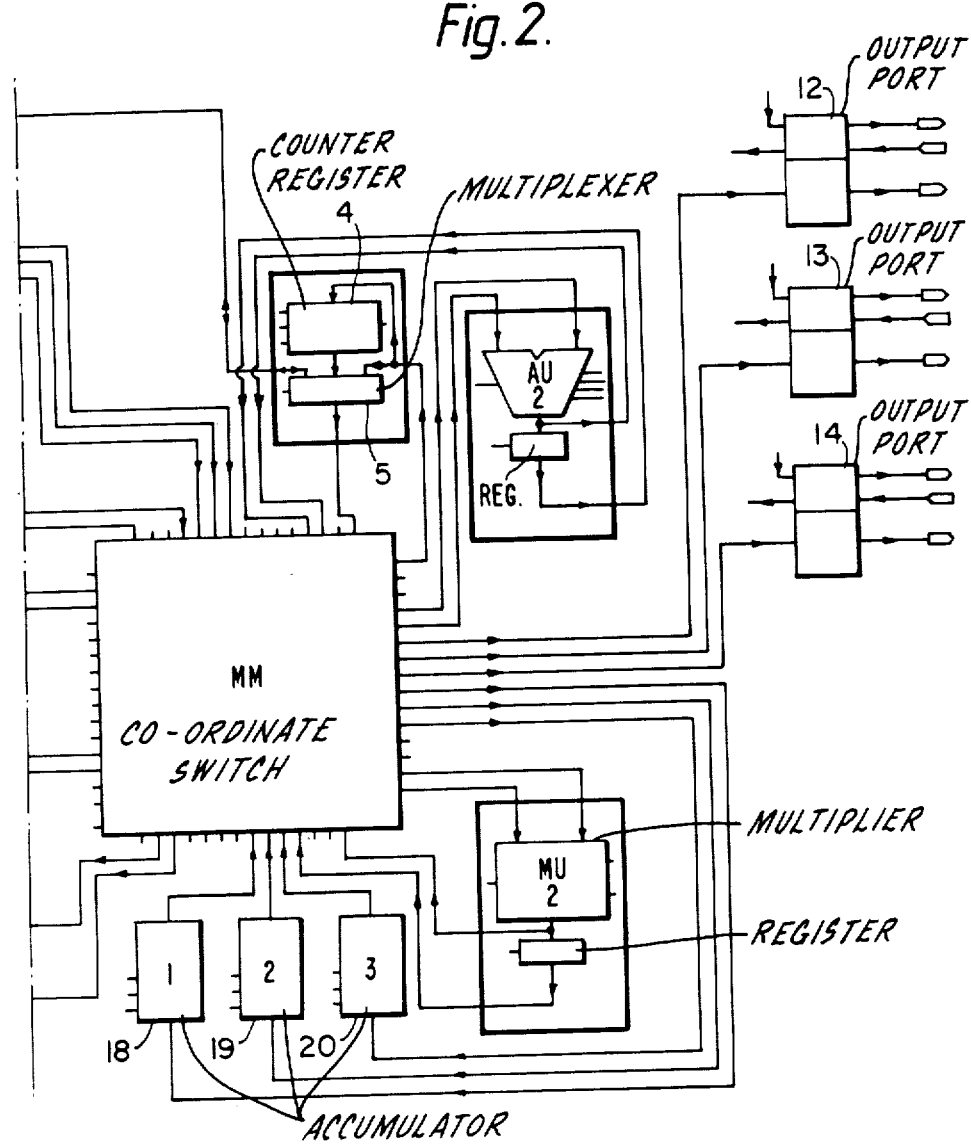
Figure 3:
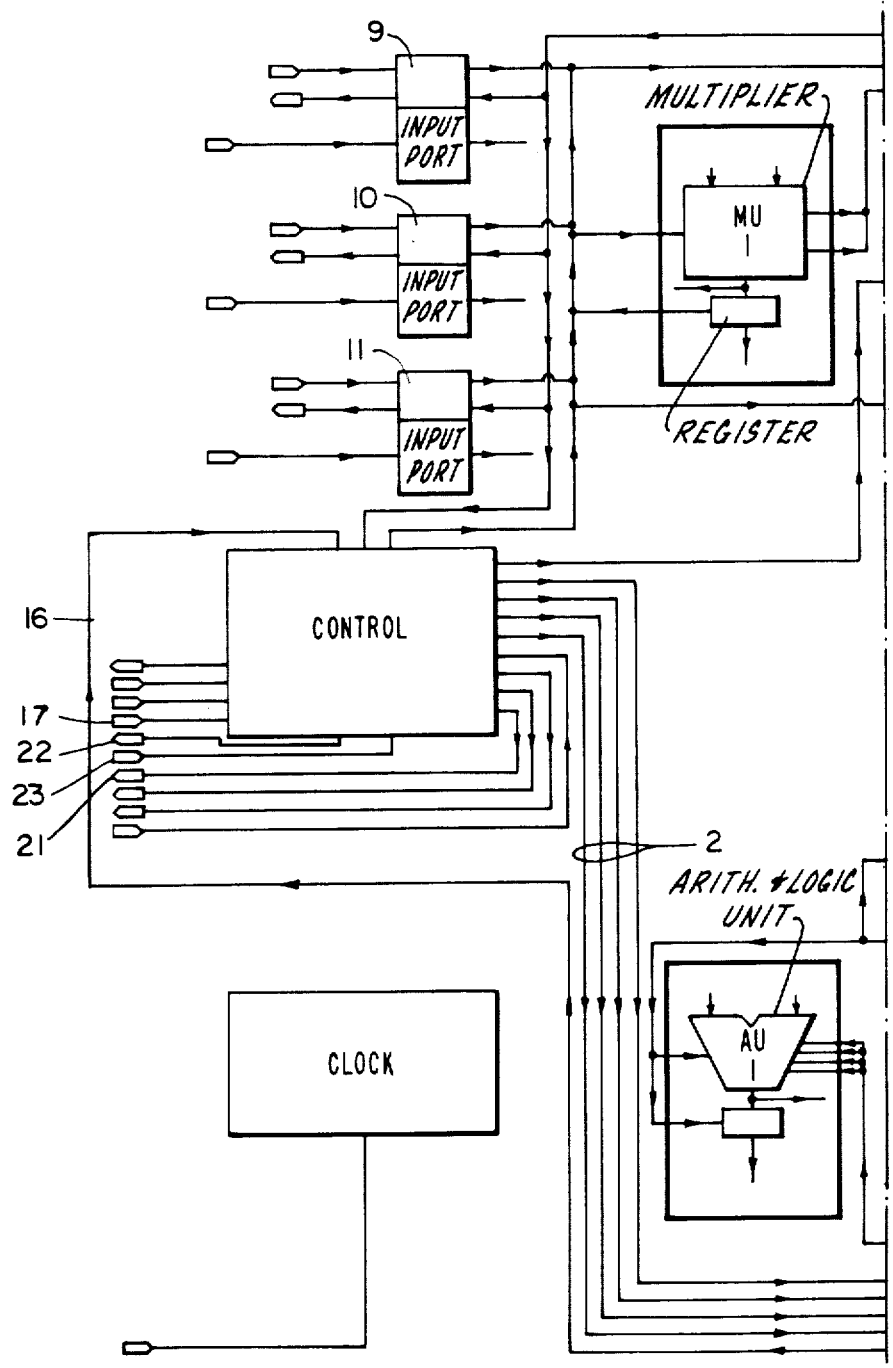
FIGS. 3 and 4 show in detail the control paths of the arrangement of FIGS. 1 and 2. Here FIG. 4 should be placed to the right of FIG. 3.
Figure 4:
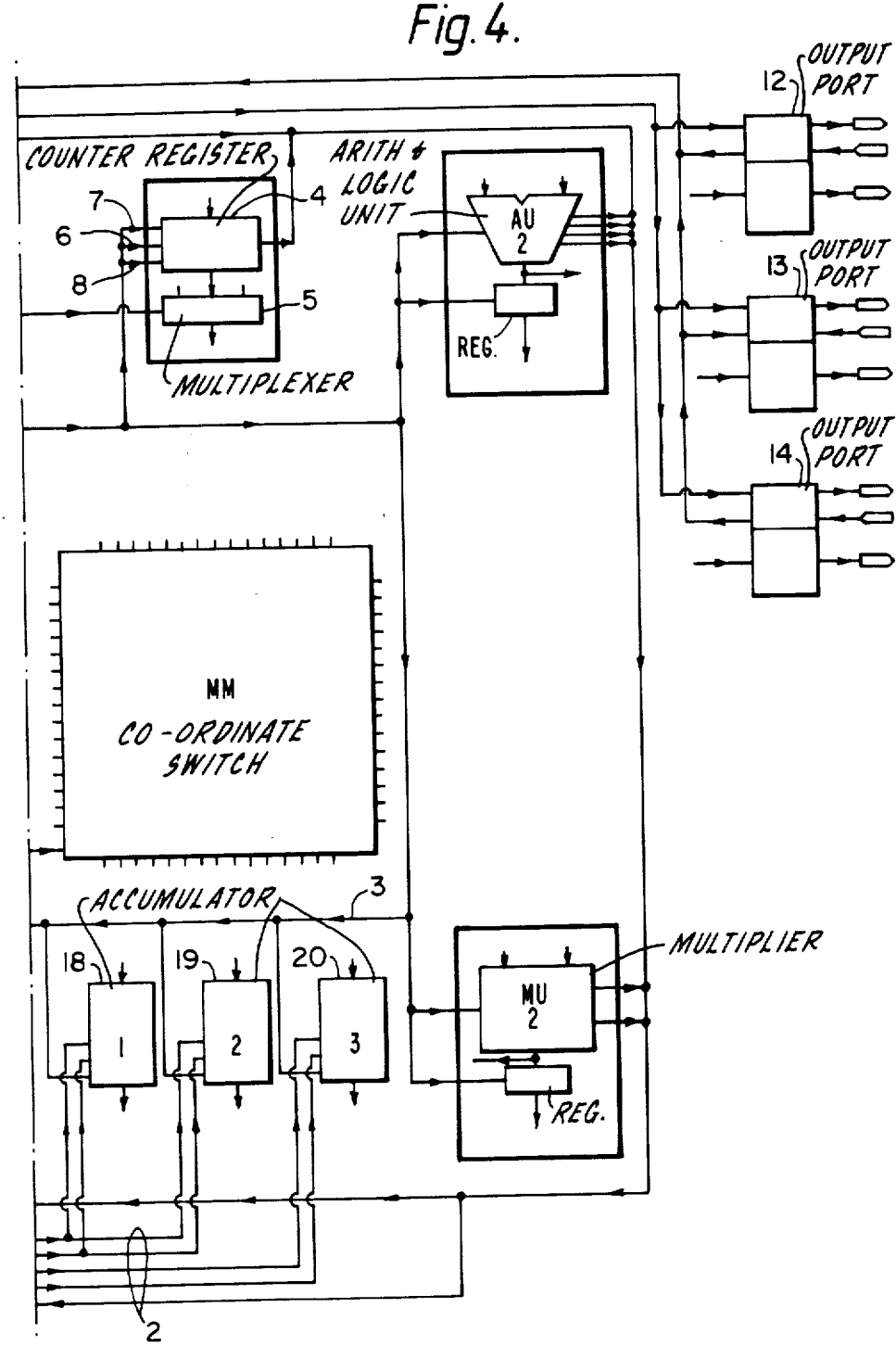

It will be noted that all the blocks of the system appear in FIGS. 1 and 2, and also in FIGS. 3 and 4. However, the first two figures concentrate on data paths between the blocks while FIGS. 3 and 4 concentrate on control paths. This split minimises the complexity of the drawings. It should be noted that in FIGS. 1 to 4 many of the connections shown as single lines are in fact multi-wire connections. Thus, for instance, data inputs to and outputs from the arithmetic and logic units AU1 and AU2 have to handle 24 bit words conveyed parallel-wise.

MM SWITCHING ELEMENT

The major switching element on the chip, see FIGS. 2 and 4 is the block MM, which is in effect a multi-path electronic equivalent of a cross-bar switch, with its 15 verticals as the inputs and its 15 horizontals as the outputs. It will be seen that some of the inputs are shown in FIG. 2 as arriving at the top of the block while others arrive at the bottom of the block. In a similar way some of the outputs leave at the left-hand side while others leave at the right-hand side. It takes data from the output latches of the various data handling blocks as its inputs. These inputs are multi-bit parallel data busses. Note that the action of the block MM is totally independent of the method of number representation used in the arrangement.

The circuitry on the block MM is synchronised to the chip clock 1 by connections (not shown) which extend therefrom to the block MM. In each cycle, after all processing is complete, all data handling blocks will latch fresh data to their outputs. After sufficient time has passed for the data to propagate through the block MM the 15 output latches of that block are latched (unless they have been individually commanded not to update their latches for the present cycle). Fresh data is then held in the output latches ready for the start of the next processing cycle.

Each of the above-mentioned output latches has associated with it four control lines to select which input to the block MM is to be connected to its latch. After output data has been latched as described above, the block MM is free to set up the data switching for the next cycle. Then each set of four control lines is decoded to determine which of the fifteen inputs to the block MM is to be connected to that output. An additional code available from the four lines can order the output latch not to latch fresh data on this cycle, but instead to hold its previous data. This is a convenient way to hold data when needed in two or more consecutive cycles, and can also save current consumption due to switching if a functional block is not used in a particular cycle.

The output latches, the decoding arrangements, and the circuitry for the control thereof are not described in detail since they can follow well-established practice.

The information used to control the switching through the block MM, i.e. to set up connections through the "electronic cross-bar switch", is largely derived from information received from the CONTROL block shown in the drawings. As will be described below this block includes memory from which stored instructions are derived.

ACCUMULATOR—RAM

The device includes three accumulator units ACC, each of which is largely random access memory (RAM), these units being numbered ACC 1, ACC 2 and ACC 3, referenced 18, 19 and 20 respectively. Each one receives its input data from a respective output of MM and supplies its output to a respective input to the block MM. As usual, these are multi-bit inputs and outputs.

The accumulator files each consists of sixty four words of random access (dual port) memory. During each program cycle, the memory receives two six-bit address-values from the control block CONTROL, which values are independent read and write addresses, referred to as a READ POINTER and a WRITE POINTER. These addresses are received over the connections indicated at 2, FIGS. 3 and 4. Each cycle, the address of the RAM is read from the location therein pointed to by the read pointer, and is sent to MM.

Depending on the state of the write enable line 3, FIG. 4, the 24 bit input data word is either written to the appropriate accumulator RAM or ignored. If the write enable signal is ACTIVE, the word at the RAM input is written to the location defined by the WRITE POINTER, whereas if that signal is INACTIVE, there is no updating of the RAM during the cycle. If the addresses specified by Read Pointer and Write Pointer differ, there is no memory conflict, but if they are the same there is a potential clash over accessing. To avoid this, care is taken to ensure that a location is READ before being WRITTEN.

COUNTER/REGISTER

We now consider a counter register 4, with which is associated a multiplexer (MUX) 5. This latter also has separate inputs from CONTROL and from MM, the former also being an output. It also has control inputs from CONTROL—see FIGS. 3 and 4.

The block 4, although shown as a single block, consists of two elements, a general-purpose register and an incrementing/decrementing counter, which share a common input source, and output on a single output to the MUX 5. These two elements are independently controlled, via the connections from CONTROL (FIGS. 3 and 4), the output from the block 4 being selectable between them.

The only arithmetic functions of the counter in the block 4 are INCREMENT, i.e. add one to the contents, or DECREMENT, i.e. subtract one from the contents. The counter uses as a binary value fifteen bits of the twenty four bit word which correspond to the mantissa field of the internal floating point number. The sign bit and eight exponent bits of the register content are not modified by INCREMENT or DECREMENT.

If the counter contents become zero, i.e. all fifteen bits of the mantissa are zero, a flag signal is made to CONTROL.

If the counter latches a new value, it cannot increment or decrement it during that cycle. The counter contents are modified before the RAM output is selected on any cycle. Both elements of block 4 share a common input; the register stores all twenty four bits without modification, while the counter stores the input as a twenty four bit number, of which only nine bits (as mentioned above) cannot be modified.

As can be seen from FIG. 4, three separate control fields are sent parallel-wise to the block 4, to control counter operations, register latching and output selection. The function of the counter is governed by a two bit COUNTER CONTROL 6 which is decoded to give the four functions available to the counter. A single bit control line 7 controls register activity, either having its contents unchanged or replacing its contents with a new word, and another one bit-line 8 controls selection of which element provides the block's output. By suitable use of the commands the counter can also be used as a second general purpose register.

INPUT PORTS

There are three input ports 9, 10 and 11, FIGS. 1 and 3, and these are similar. Each one includes the following functional blocks, see FIG. 5:

(a) Input Write Data Pointer IWDP, an incrementable three bit buffer for the address of the next location in the FIFO to be written to. After a write operation, the content of IWDP is incremented ready for the next write operation.

(b) Input Read Data Pointer IRDP is another incrementable three bit buffer, similar to IWDP bit but used to control reading.

(c) FIFO is a twenty four bit wide eight bit buffer controlled by IWDP and IRDP.

(d) Input Data Latch IDL: holds the last data output from the FIFO until the next read operation. Hence the block MM (FIGS. 2 and 4) can read from the input data latch as many times as needed without reading again from FIFO.

(e) FIFO CONTROL FC controls IWDP and IRDP to ensure proper access to the FIFO. If the FIFO is empty, in which case INPUT WRITE POINTER is one less than INPUT READ POINTER, then we have an input WAIT state, which continues until the above relation between the pointers no longer applies. If the FIFO is full, in which case the pointers are equal, the input ready output lead IREADY is inactive. This ensures that a preceding node in a multi-node system using chips as described herein is unable to transmit.

Writing to an input port is asynchronous, as this will, in a multi-node system, be governed by the interconnecting node. Write is instigated by a rising edge on input strobe line ISTB, from the output of the preceding node, and only occurs when IREADY from the port shown is ACTIVE. Note that a similar input method would be used if the arrangement is used on its own, e.g. as the control means of a system node in a local area network. When the rising edge on ISTB is detected the first twelve bits of the word from the data bus are read into the least significant part of the FIFO location indicated by IWDP. IREADY then goes INACTIVE, when the data transmitter outputs the second twelve bit portion of the word to be placed in the most significant portion of the FIFO location. Then IWDP is incremented.

If the FIFO is not full, the IREADY goes ACTIVE, otherwise it remains INACTIVE until a word is read from the FIFO.

Figure 5:
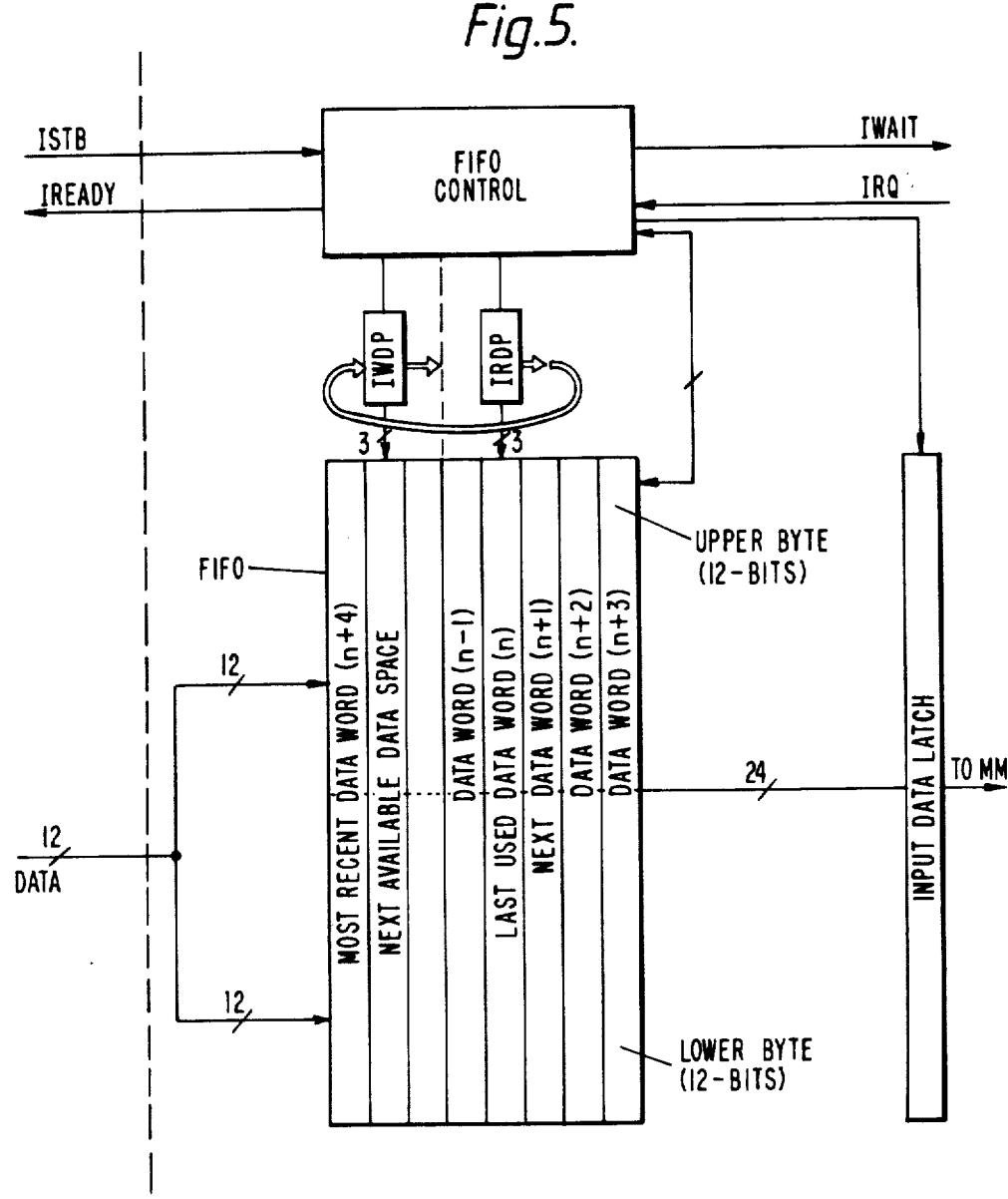
FIG. 5 shows schematically the arrangement of an input unit of the arrangement of FIGS. 1 to 4.

Reading from an input port such as FIG. 5 is synchronous with the node chip clock, and occurs when read is requested by a pulse on IRQ, which is only sent from CONTROL if the input wait lead IWAIT is INACTIVE. IRDP is then incremented. The word thus read out passes to IDL from which it can be read to MM, one or more times as needed.

OUTPUT UNITS

Figure 6:
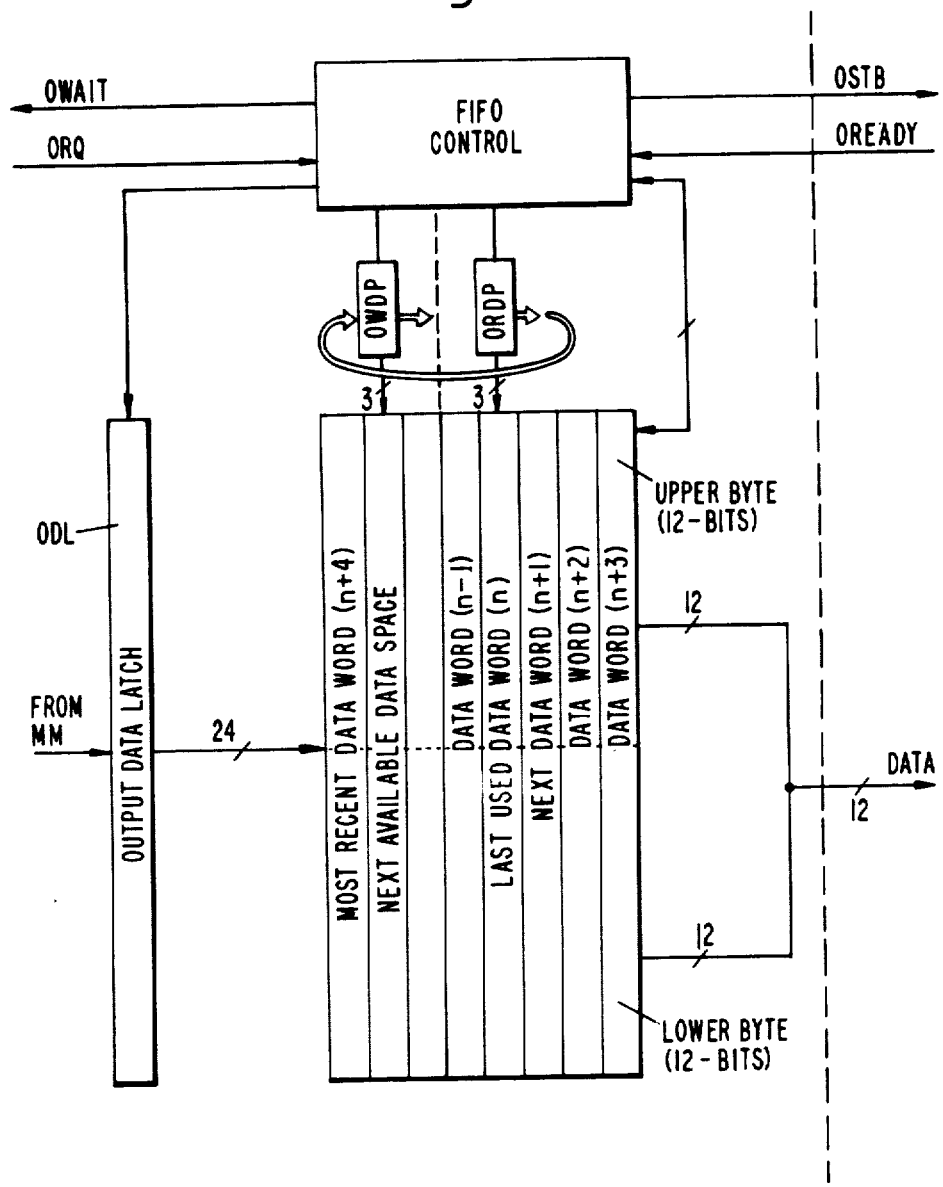
FIG. 6 shows schematically the arrangement of an output unit of the arrangement of FIGS. 1 to 4.

The outputs of the system are three in number, 12, 13 and 14, FIGS. 2 and 4, and one of these ports is shown in FIG. 6. It functions in a manner similar to that of FIG. 5, but in reverse. Hence no detailed description is considered necessary. Note that the pointer registers used here are for an output write data pointer OWDP and an output read data pointer ORDP.

Writing to an output port is synchronous with the chip clock and occurs when an algorithm running on the node produces data to be passed out, e.g. to the next node in a multi-node system. Output is requested by a pulse on the output request line ORQ, while only occurs if OUTPUT WAIT OWAIT is inactive. The data in the output data latch ODL is only written into the FIFO location addressed by OWDP, whereafter OWDP is incremented.

Reading from an output port is asynchronous as this is governed by the next device, e.g. another similar node in a multi-node system. Output from the node occurs when there is untransmitted data in the FIFO and when the OREADY line is ACTIVE. ORDP is then incremented. Then the twelve least significant bits in the addressed FIFO location are read out, after which the output strobe line OSTB is made ACTIVE. The next device then makes OREADY INACTIVE as a result of which the twelve most significant bits are sent, and OSTB goes INACTIVE.

CONTROL BLOCK

We now consider the CONTROL Block FIGS. 1 and 3. This has a multi-path flag input 16 over which flag signals indicative of the conditions of the functional blocks are received from those blocks. These flags are combined with three user flags in a sixteen bit condition register, used, inter alia, for jump control. There are also six lines from the input blocks 9, 10, 11 and the output blocks 12, 13 and 14. These are used by the control block when an input or output instruction has to be implemented.

Outputs extend from CONTROL to the block MM, which connection is not shown in FIGS. 3 and 4 to avoid unduly complicating the drawings and other outputs extend as shown to control the functional blocks. This involves eighty-six bits, sixty of which are used by MM, the others by the functional blocks. CONTROL also outputs Read and Write addresses from its internal data pointer registers to three accumulating RAMs 18, 19 and 20, of which the RAMS 18 and 19 share pointers while 20 has its own.

The three user flags referred to above the available off-chip via outputs from CONTROL. In the multi-node applications these flags are used by an array controller. In such case a control input port, control output port and handshake lines are taken off the chip to the array controller (by a direct or indirect path).

CONTROL contains several registers (not shown separately) used for various purposes in the chip. These are:

(a) Flag Register, 16 bits wide, which contains the user flags and the other flags mentioned above.

(b) Condition Registers are eight in number and are 32 bits wide. In the multi-node case they are loaded from the array controller. A condition register is selected in each of the micro-instructions used to control the operation of the chip, and is compared with the flag register to control program branching. Condition registers are twice as wide as the flag registers to accommodate a mask, which selects whether or not a particular flag is included in the match condition, and if included whether it is ACTIVE or INACTIVE. Thus any combination of flags in any condition can be examined.

(c) Accumulator Data Pointer Registers accommodate pointers for the RAM's 18, 19 and 20, and there is also an Index Register which is loaded by the array controller.

(d) Program Vector Registers are eight in number and are each six bits wide. They are used to store six-bit addresses, so eight separate microprograms can be accessed, each starting at an address specified in one of these registers. CONTROL block is set to microprogram others than to what it was set by sending a VECTOR command to it.

(e) Status Register contains status information relating to the mode of operation and to the current status of various WAIT lines, etc.

(f) Signature Register holds the chip's signature as passed from a previous node chip in the array.

(g) Mode Control Register defines the current operating mode of the chip. The modes are:

(i) Signature Initilization Mode. In this mode, signature control is propagated across the array between the input and output ports of the node. A signature signal is loaded into a signature register from the control input port 17, where it is incremented and passed to the next node in the array via a control output port 21. Thus an unique signature can be allocated to a particular node under external control. This is needed as interconnect is local to nodes within the array. To load a program, coefficients or data into a particular node chip embedded deep within an array the information has to pass via other nodes so a node has to be able to see if the data is for itself or whether it should be passed on to a later node chip.

A node can also respond to data tagged with a "broadcast" signature, meaning that the information is for all nodes. (ii) Program Load Mode, in which program information is downloaded from the array controller for storage in the node's writeable control store(s) WCS in the block CONTROL.

(iii) Coefficient Load Mode, in which data is downloaded from the array controller to a node for storage in one or more of that node's accumulators.

(iv) Register Load Mode, in which data is downloaded from the array controller to a node for storage in the internal registers of CONTROL referred to above.

(v) Run Mode In this mode the chip executes microprograms in CONTROL's writeable control stores WCS. If an "Accept Array Control" bit is set in the micro-instruction a new control word is read from the control input 17 and the last control word passed to the next node via the control output 21.

The control word can specify a new index value to be loaded into the index register, or a new vector to be loaded into the program counter.

(vi) Halted Mode in which each node is halted and awaits the next control word.

(vii) Interrogate Mode is used to interrogate individual nodes and read back information via the status port.

(viii) Test Mode is used to instigate a self-test procedure.

The micro-instructions referred to above are each divided into two parts, the signals used to control the functional blocks and the signals used internally by CONTROL.

Other inputs and outputs from CONTROL include a status output 22, and a reset input 23.

We now consider the data pointer control, used by CONTROL. The accumulator data pointers are controlled by a 27 bit field in the micro-instruction, these points being listed below.

(a) Data Pointer Function Control This bit selects the mode of the data pointer operation, mode 0 in which all data pointers are loaded from the micro-instruction and the index added if needed, or mode 1 in which all the data pointers are cleared, incremented, decremented, or left unaltered.

(b) Index Select are two bits one for the Read Pointer and one for the Write Pointer of ACC1/ACC2, 18 and 19, FIGS. 2 and 4. They define whether the Index Register content is added to the relevant data pointer value. They are ignored in Mode 1, above.

(c) Read and Write Pointers are four in number, each six bits long and they are the Read and Write Pointers for ACC1/ACC2, 18 and 19, and ACC3, 20. In mode 0 each pointer field contains an address used to reference the related accumulator(s). In mode 1 only the first two bits are used, to define the following commands:

00 Leave data pointer unchanged
01 Increment data pointer
10 Decrement data pointer
11 Clear data pointer.

Program Jump Control

Branching in the micro-instruction sequence is defined by the Program Jump control field in the micro-instruction, as follows:

(i) Jump type Select is two bits which define the following jump types:
 (a) Jump Never
 (b) Jump Conditional
 (c) Jump to Sub-Routine Conditional
 (d) Return from Sub-Routine Conditional.

(ii) Jump Condition Select When the jump type select specifies a conditional jump, this three-bit field selects which of the eight 32 bit condition registers, pre-loaded with the program, is used to compare with the 16 bit flag register, as indicated above, to decide whether to jump or not.

(iii) Jump Address is a six bit field which contains the absolute address to be loaded into the program counter, and is only used in the Jump conditional and Jump to sub-routine types.

User Flag Control is a three bit control field used to manipulate the user flags UFL0 to UFL2, in the flag register. The following comands are available:

000, Leave flags unchanged
001, Set UFL0
010, Set UFL1
011, Set UFL2
100, Set next user flag
101, Set next user flag if conditions met
110, Spare
111, Clear all user flags.

The "set next user flag" command 100 sets the flags 0, 1, 2 in that order, according to which flags are already set.

Array Control Bit is used at the beginning or end of a given algorithm cycle. It causes a new control word from the array controller to be read from the control input, and the last control word to be passed on via the control output to the next node chip in the array. Thus new index values or control parameters are passed round the array.

A typical application of the data processing arrangement described herein is in the signal processing equipment for a systolic or wavefront array for adaptive antenna processing. Here signals from a number of channels are processed by a multi-layer array of similar processors. These form a triangular structure and are interconnected in a nearest-neighbour manner, with the processing operations occurring under the control of an array controller as referred to earlier in this specification.

Thus in such an application, only the boundary nodes of the array have direct access to the outer world, all other nodes being embedded in the array. Thus control commands to such embedded nodes have to be passed via other nodes. Each node is, of course, a data processing arrangement as described above. Each node has a control-in port to enable commands to be received and a control-out port to pass commands to subsequent nodes in the array. The signals being processed by such a node travel through the node array in a wave-front like manner and hence the processing is often referred to as wave-front processing.

Connection of a node within an array

Figure 7:
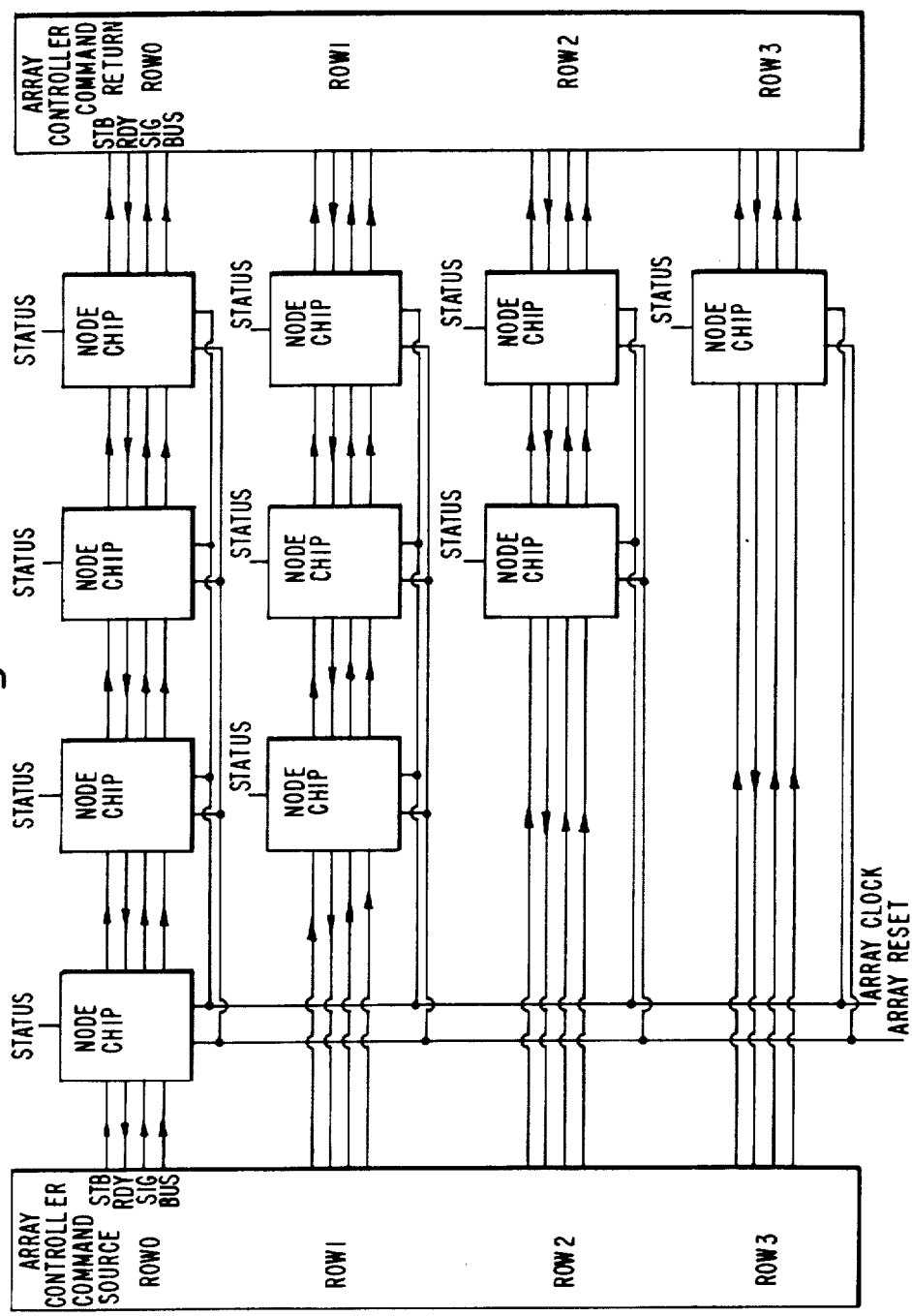
FIG. 7 shows the control connections for an array of processors each of which is as described with reference to FIGS. 1 to 6.

We have mentioned above that arrangements such as described with reference to FIGS. 1 to 6 may be used in arrays for signal processing. A typical control structure for such an array is shown in FIG. 7. Each row has its nodes connected together by the horizontal control busses and common reset and clock lines are connected to each node. The status lines from the nodes, each shown leaving its node from the top edge are coupled directly to an array controller by connections (not shown), thus enabling each node to flag exceptional conditions at any time if required. The rows of node chips are connected to the array controller at both ends, control information being fed into the row at one end and passed through the nodes to be returned to the array controller from the opposite end.

Signatures

Each node chip has a unique 'Signature' associated with it. This is needed since interconnect is local to nodes within the array, and to load a program to a node deeply embedded within an array structure, the information must be routed via other nodes in the array. A node must therefore be able to ascertain whether data is intended for itself or whether it should be passed on to a subsequent node. Program or data words are therefore prefixed with a signature pertaining to a particular node within the array.

In addition to recognising its own signature, all node chips respond to a 'Broadcast Signature', which is a reserved signature which cannot be allocated to any single node chip. All program code, coefficients, data or control comands prefixed with the 'Broadcast Signature' are both obeyed and passed on by all nodes.

Signature Initialisation

Before a node can respond to any control commands it has to be assigned a signature. This is achieved by a 'Signature Initialisation Mode' which is entered automatically upon a RESET as well as being configurable from the array controller. When in this mode, a signature is propagated across the array between the control-in and control-out ports of each node chip. Within each chip the signature is loaded into a signature register from the control-in port. The signature is then incremented before being passed on through the control-out port, so that each node within the array row acquires a unique signature.

Since the control data bus is 8 bits wide the maximum number of unique signatures possible in a row of interconnected nodes is 256. One of these signatures must be the 'Broadcast Signature', so the maximum number of nodes in a row is 255.

Signature Recognition

Before a protocol can be established for downloading data to the chips in the array, it is necessary to define how signatures are recognised. A signature is merely an eight bit byte and is indistinguishable from any other byte. Broadly speaking there are two methods by which a signature can be differentiated from other data:

(1) By means of a defined transmission order of bytes;
(2) By an extra bit in addition to the eight bit control data bus which is asserted when a signature is present.

The disadvantage of (1) is that the transfer protocol becomes more complicated, so the logic needed on each node chip becomes more expensive.

Provided that an extra bus line can be accommodated in the control bus then the second method is better. Hence this method is used in the present case. Whenever a signature is present this bit is asserted. This 'Signature Present' line is passed from node to node in the array effectively as a ninth bit in the control bus.

Error Detection

The maximum amount of program code to be loaded to each node is in excess of 1 kilobyte, with each micro-instruction consisting of 144 bits (or 18 bytes). Clearly, loading the array needs a large number of bytes to be downloaded from the array controller. Data can be corrupted by electrical noise, which depends upon the data rate and the loading, so some form of error detection is desirable to avoid corrupt data being programmed into the nodes.

In the present arrangement, the error detection method used is to make the array controller itself responsible for error detection. This avoids the need for individual error detection circuitry on each chip. Data is fed into a row of the array at one end and passed through the nodes. After being output from the last node the data is fed back to the array controller where any corruptions are detected. Corruptions may be due to electrical noise, or maybe due to a node chip in the row.

Any corruptions due to noise are correctable by re-transmitting the data. Corruptions due to a malfunctioning node chip are not correctable by re-transmission and their presence indicates an array fault.

It is important to differentiate between the detection of errors occurring on an otherwise correctly functioning array, and errors due to malfunctions of the array. The latter malfunctions can be node chip failure, or short/open circuits. The second situation is most likely to occur while commissioning a new PCB or after a power up. Faults such as these are detected during the power-up; self-test; or array initialisation phases. The status lines can flag to the array controller:

(i) A node chip self-test failure.
(ii) A node chip waiting to receive control data.
(iii) A node chip waiting to send control data.

Thus interconnection faults and node chip failures can be detected.

Control and Wavefront Synchronisation

This is significant in the signal processing associated with systolic and wavefront arrays mentioned above. After the nodes in the array have had their program code and other parameters downloaded they are switched into RUN mode by the array controller and wavefronts of data begin to pass through the array. Control commands or new parameters must be synchronised with such wavefronts. This is achieved by holding the control command or parameter within a node and passing it on only when the algorithm cycle for that node is complete. A bit in the micro-instruction, the 'Accept Array Control Bit', is used at the beginning of a given algorithm cycle to enable a new control word from the array controller to be read from the control input and the last control word to be passed on via the control output to the next node chip in the array. Thus new index values or control parameters are passed around the array in synchronism with the wavefront.

This mechanism is only in operation when in RUN mode; at all other times control commands and parameters are passed through.

Waiting for Control or Data

The following conditions will halt a node until the condition is removed.

(i) If the 'Accept Array Control' bit is set and no control command is strobed into the node then the node halts until the data arrives.
(ii) If the node is unable to pass on its control to the succeeding node, then it cannot accept control from the preceding node, and halts until control is passed on and the new control accepted.
(iii) If data is not available at an input port when required at a step in an algorithm cycle, then the node halts until the data is presented.
(iv) If an output FIFO is full when data is to be written to it then the node halts until the data can be written.

Requirement for a Data Path from Control Block MM

Due to the ability of the array controller to load the accumulators and register/counter on the node chip (in addition to loading the writeable control store) it is necessary to include a data path from the CONTROL (on the node chip) to the block MM. Thus, when operating in coefficient load mode, or register load mode, data is downloaded from the array controller to the node chip, and routed to the required destination via the CONTROL and MM.

In addition there is also a requirement for the CONTROL to be able to interrogate the contents of the accumulators and the register/counter.

A multiplexer 5 is therefore included between the output of the register/counter and the input to the block MM, together with a bidirectional data bus between the CONTROL and the multiplexer 5. This multiplexer is controlled by the two load/read select lines from the controller and switches data in the following way:

(a) In normal operation the multiplexer 5 is switched to connect the output from the register/counter to an input to MM.

(b) When CONTROL wishes to load data to the accumulator or the register/counter, the multiplexer 5 switches the bidirectional line 25 (FIG. 1) from CONTROL to MM.

(c) When CONTROL wishes to interrogate the contents of the accumulators or the register/counter the multiplexer 5 switches between a line from MM and the line 25 to CONTROL.

Communication Protocol

We here describe briefly the communication protocol to be used by the array controller in controlling the constituent nodes in an array.

The node chips have several modes of operation as described above. The mode of operation is set by the contents of the Mode Control Register (MCR) within the node chip controller.

Each node operates in accordance with the following protocol:

(i) Once set to a mode of operation, the node maintains it until a new signature and mode control byte are received.

(ii) A Mode Control Byte (MCB) is always sent by the array controller to each node immediately after a signature.

(iii) Following a reset all nodes are placed in the 'Signature Initialisation Mode' allowing the array to be configured.

(iv) If a received signature does not match that held in the node (or the Broadcast Signature) then the node de-activates itself and passes control data through to the next node in the row.

(v) If a received signature does match that held in the node (or is the Broadcast Signature) then the node obeys the following MCB, switches to the new mode, and is regarded as 'Activated'. All following data is assumed to be for the 'Activated' node (or nodes) until it is 'De-activated' by the Signature Present (SIG) line being asserted.

(vi) When 'Activated' all nodes continue to pass through control commands.

Clock Block

The clock block transforms the Array Clock rate, in the arrangement described 12.5 MHz, by multiplying by 4, to the required node cycle rate of 50 MHz. This internal clock signal is then distributed to all the function blocks within the Node Chip provided that the RESET line and the disable clock lines are INACTIVE.

When the RESET line is ACTIVE the clock suspends signals and resets itself to the start of a clock cycle, in which case the RESET line is made INACTIVE.

When the disable clock line becomes ACTIVE (i.e. when a port's WAIT line is ACTIVATED and an attempt is made to use that port) the clock is required to halt execution of the micro-instructions and freeze the clock until it becomes INACTIVE.

In an alternative arrangement, when the disable clock line is ACTIVE, the clock internal to the clock block continues but the outputs of the clock block are disabled (i.e. the clock outputs would be frozen in their present state). A check on the state of the disable clock line is made at the beginning of each clock cycle and execution continues once the disable clock line is INACTIVE.

Adaptive Antenna Application

With an adaptive or systolic antenna array, a number of antennas are used, and their outputs are processed so as to adjust their directional response to null interference or jamming, and thus to enhance the reception of the wanted signals. In this respect, attention is directed to a paper "Application of a Systolic Array to adaptive beamforming", by C. R. Ward, A. J. Robson, P. J. Hargrave and J. G. McWhirter, IEE Proceedings, Vol. 31, Pt.F. No. 6, Oct. 1984, pp 638–645.

Figure 8:
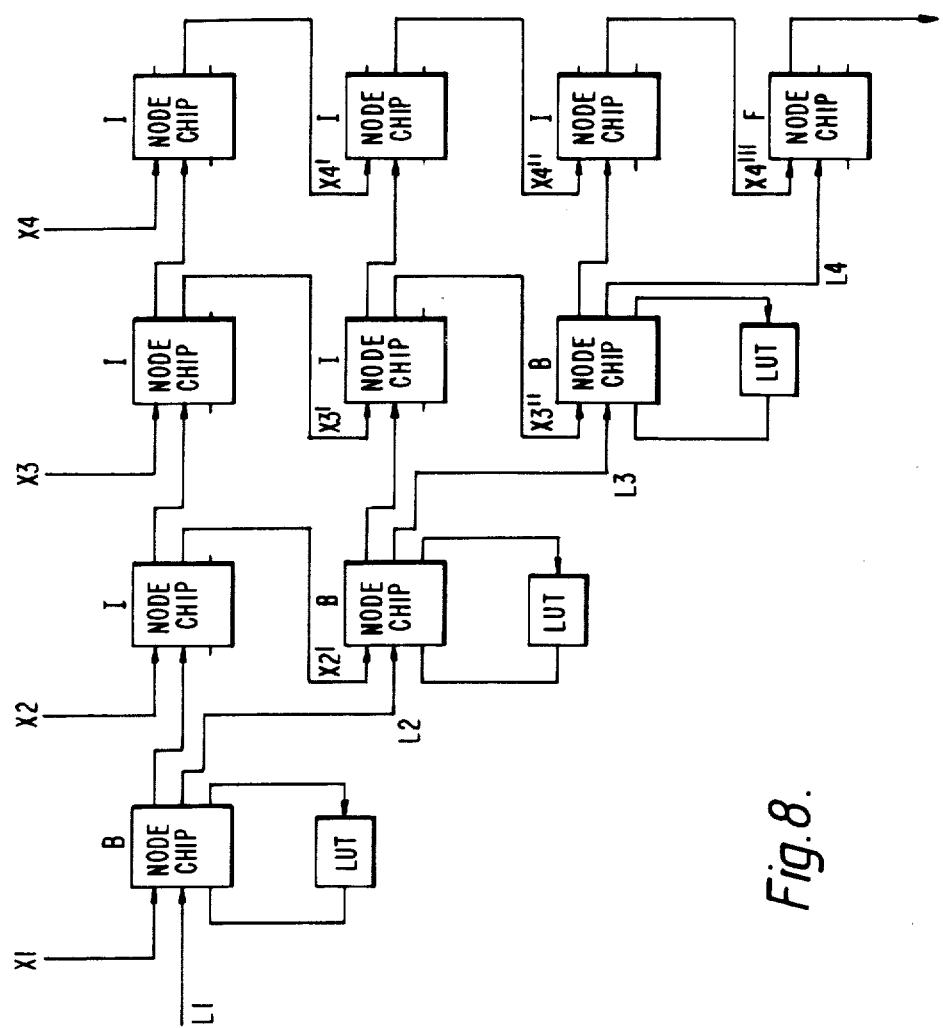
FIG. 8 shows the data connections for the array of processors shown in FIG. 7.

The array of processors used is shown in FIGS. 7 and 8, of which FIG. 7 shows the control connections between the processors, each of which is as shown in FIGS. 1 to 6, while FIG. 8 shows the data flow connections. The inputs from the associated antennas, assumed in the present case to be four in number, are applied to the inputs X1, X2, X3, X4 of the top row of processors. The outputs from these processors go to inputs of the next row of processors, as can be seen. This connection pattern is continued until we reach the single last-row processor whose output provides the output of the array.

Each input is applied from its antenna to its processor via the usual reception circuitry, which includes filters and the application of weighting factors to the respective inputs. There may be fixed factors or continuously adjustable, dependent on the system. Certain of the processors, as can be seen, have additional memory in the form of look-up tables LUT, from which constants for use in the signal processing are obtained during the course of the processing, under the control of the programs for those processors.

In general the program algorithms used for the processors are of two types, one of which is for a processor at the edge of the array such as those to which the antenna outputs are applied and the ones shown with look-up tables, and the other of which is for the processors not regarded as edge processors.

The signal inputs are so controlled that a number of successive "electronic snap shots" are taken of the signals on those inputs, and each such "snap shot" is progressed through the array in a stage-by-stage manner. Thus in effect a signal wavefront is progressed through the array with processing effected at each stage until the final signal, enhanced and relatively free from interference or jamming, appears at the final output.

The stage-by-stage progression through the array is effected under control of the array controller, FIG. 7, which commands the "layers" of the array to respond sequentially, under control of the commands issued by the command source. Each such command flows through the processors of its layer, and when it reaches the array controller command return block, a signal therefrom causes the next command to issue from the command source.

Thus the wavefront progression through the array occurs to effect the required signal processing.

We claim:

1. An electronic data processing arrangement implemented on a single semiconductor chip, which includes input units and output units, memory units, processing units and an interconnecting network which interconnects said units, said units and said interconnecting network being located on said chip, wherein:

the interconnecting network is an electronic co-ordinate matrix array on the chip, which matrix array is formed by electrical data paths including a first set of parallel data paths forming one co-ordinate of the array and a second set of parallel data paths forming a second co-ordinate of the array, the data paths of said first set intersecting the data paths of said second set;

semiconductor gates are provided at each intersection between a first co-ordinate data path and a second co-ordinate data path via which connections between said data paths can be set up by the operation of said gates;

said first and second co-ordinate data paths each consists of a plurality of conductors so that each said intersection between a first co-ordinate data path and a second co-ordinate data path is controlled by a set of said gates, the arrangement of the matrix being such that two or more connections can be simultaneously set up through the matrix array;

said input units, said output units, said memory units and said processing units are each connected to one of said electrical data paths, so that a unit connected to a first co-ordinate data path and a unit connected to a second coordinate data path can be interconnected by the operation of the appropriate one of said sets of gates;

at least one control unit is provided, which control unit is implemented on said chip and is connected via respective control conductors to said sets of gates, such that said control unit can, by the energization of respective ones of said control conductors cause the establishment of connectors between respective ones of said units via the appropriate ones of said sets of gates; and at least one of the memory units implemented on said chip contains program data which can be extracted from that memory unit and applied to said control unit to cause the establishment of connections between respective ones of said units via said co-ordinate matrix array.

2. A data processing arrangement as claimed in claim 1, wherein the processing units include arithmetic units and multipliers, wherein each said processing unit has its output connected via a register to an input to the interconnecting network, and wherein each said processing unit has its output also connected directly to an input of the interconnecting network so that the output from a said processing unit can be routed to the interconnecting network direct or via a said register.

3. A data processing arrangement as claimed in claim 2, wherein there are two said multipliers located on the chip and each of which derives both of its inputs from outputs of the interconnecting network, and wherein there are two said arithmetic units on the chip each of which derives both of its inputs from outputs of the interconnecting network.

4. A data processing arrangement as claimed in claim 1, wherein the output units are each provided with a multi-bit latch in which a word to be sent from that network is placed prior to sending, and wherein the latches are so controlled that words can be read therefrom a plurality of times.

5. A data processing arrangement as claimed in claim 4, wherein each said output latch has associated with it a set of control lines from said control unit via which a bit combination may be received parallel-wise, which combination identifies the input of the network to be connected to that latch, and wherein the gates between said wanted input and said output latch are opened so that the word on said input passes via the gates to the appropriate one of said latches.

6. A data processing arrangement as claimed in claim 1, wherein the memory units include a plurality of accumulator units each of which is a multi-word random access memory, and wherein each said accumulator has its inputs connected to outputs from the interconnecting network and its outputs connected to inputs of the interconnecting network.

7. A data processing arrangement as claimed in claim 1, wherein each said input unit includes buffer storage means for a plurality of data words, and each said output unit includes buffer storage means for a plurality of data words.

8. A data processing arrangement as claimed in claim 7, wherein writing into the buffer storage of a said input unit is asynchronous but read out therefrom is via an input data latch and is synchronous to a clock also on the chip.

9. A data processing arrangement as claimed in claim 8, wherein writing into the buffer storage of a said output unit is synchronous with a clock on the chip, and wherein read out of data from the buffer storage of an output unit is effected via an output data latch and is asynchronous.

10. A data processing arrangement as claimed in claim 1, wherein the chip also carries counter-register unit whose output is coupled to an input of the interconnecting network and which has an input from an output of the interconnecting network, wherein the counter-register unit includes a general purpose register and an incrementing-decrementing counter which have common inputs and outputs, and wherein the register and the counter are separately controllable from the said control unit on the chip.

11. A data processing arrangement as claimed in claim 10, wherein a multi-digital number on reception from the control unit by said counter-register can be stored in said register and/or said counter, wherein a said number thus received in said register is stored therein un-modified while when a said number is stored in said counter part of that number can be incremented or decremented as needed by a data processing operation in progress, and wherein the number can be outputted from either said register of said counter as required by such operation.

12. A data processing arrangement as claimed in claim 11, wherein the counter-register output is coupled to the interconnecting network via a multiplexer whose other inputs include an input from the said control unit.

13. A data processing arrangement as claimed in claim 1, wherein the control unit on the chip has a multi-path input connected to the other units on the chip over which the control unit receives flag signals indicative of current conditions of those units, and wherein the control unit includes a register in which those flag signals, possibly with other flag signals from outside the chip, are assembled into a control word which is used in the control of the arrangement.

14. A data processing arrangement as claimed in claim 13, and wherein the control unit includes further registers loaded with information from outside the chip which information is used for control purposes, and vector registers used to control selection of programs to be executed by the arrangement.

15. A data processing arrangement as claimed in claim 14, wherein the control unit also includes a signature register in which may be stored a signature word identifying the arrangement, and wherein when such an arrangement is used in a multi-chip system, information intended for it is accompanied by its signature, information being accepted if accompanied by its said signature and being passed to another chip if not accompanied by its said signature.

16. A data processing arrangement as claimed in claim 15, and wherein the control unit can, when the arrangement is used in a multi-chip system, respond to information intended for all chips of such a system when accompanied by a broadcast signature.

* * * * *